United States Patent
Yung et al.

[11] Patent Number: 6,128,721
[45] Date of Patent: Oct. 3, 2000

[54] TEMPORARY PIPELINE REGISTER FILE FOR A SUPERPIPELINED SUPERSCALAR PROCESSOR

[75] Inventors: Robert Yung, Fremont, Calif.; William N. Joy, Aspen, Colo.; Marc Tremblay, Palo Alto, Calif.

[73] Assignee: Sun Microsystems, Inc., Mountain View, Calif.

[21] Appl. No.: 08/153,814

[22] Filed: Nov. 17, 1993

[51] Int. Cl.⁷ .................................................. G06F 15/00
[52] U.S. Cl. ............................................................ 712/23
[58] Field of Search .................................. 395/775, 375

[56] References Cited

U.S. PATENT DOCUMENTS

| | | | |
|---|---|---|---|
| 4,187,539 | 2/1980 | Eaton | 395/375 |
| 4,228,497 | 10/1980 | Gupta et al. | 395/775 |
| 4,598,365 | 7/1986 | Boothroyd et al. | 395/375 |
| 4,819,155 | 4/1989 | Wulf et al. | 395/375 |
| 4,849,926 | 7/1989 | Hasegawa | 395/800 |
| 4,991,078 | 2/1991 | Wilhelm et al. | 395/375 |
| 5,019,967 | 5/1991 | Wheeler et al. | 395/775 |
| 5,129,067 | 7/1992 | Johnson | 395/375 |
| 5,136,697 | 8/1992 | Johnson | 398/375 |
| 5,261,071 | 11/1993 | Lyon | 395/425 |
| 5,274,818 | 12/1993 | Vasilevsky et al. | 395/700 |
| 5,299,320 | 3/1994 | Aond et al. | 395/375 |
| 5,337,415 | 8/1994 | DeLano et al. | 395/375 |
| 5,345,569 | 9/1994 | Tran | 395/375 |

FOREIGN PATENT DOCUMENTS

| | | | |
|---|---|---|---|
| 9310545 | 1/1993 | WIPO | G06F 9/38 |
| 9322722 | 11/1993 | WIPO | G06F 9/38 |

OTHER PUBLICATIONS

Microsoft Press Computer Dictionary Nov. 1, 1993.
Johnson, *Superscaler Microprocessor Design*; pp. 94–95; Prentice Hall; Englewood Cliffs, New Jersey; 1991.
European Search Report dated Mar. 1, 1995; Examiner T. Daskalakis.

*Primary Examiner*—Paul R. Myers
*Attorney, Agent, or Firm*—Blakely Sokoloff Taylor & Zafman

[57] ABSTRACT

A processor method and apparatus. The processor has an execution pipeline, a register file and a controller. The execution pipeline is for executing an instruction and has a first stage for generating a first result and a last stage for generating a final result. The register file is for storing the first result and the final result. The controller makes the first result stored in the register file available in the event that the first result is needed for the execution of a subsequent instruction. By storing the result of the first stage in the register file, the length of the execution pipeline is reduced from that of the prior art. Furthermore, logic required for providing inputs to the execution pipeline is greatly simplified over that required by the prior art.

9 Claims, 4 Drawing Sheets

TEMPORARY PIPELINE REGISTER FILE FOR A SUPERPIPELINED SUPERSCALAR PROCESSOR

BACKGROUND OF THE INVENTION

1. Field of the Invention

The present invention relates to the field of computer system design. More specifically, the present invention relates to the design of superpipelined and superscalar microprocessors.

2. Art Background

When microprocessors were first introduced, they typically had a central processing unit (CPU) that used a serial hardware organization. This meant that the major logic blocks (e.g. fetch, decode, execute and write back) were simply chained together so that successive stages had to wait until the previous logic block finished its operation. Therefore, an arithmetic logic unit (ALU) of the execute logic block that was to execute an instruction had to wait for operands to be read from a register file. The reading of the operands from the register file, in turn, had to wait until the instruction was decoded. The decoding of the instruction, in turn, could not happen until the instruction was fetched from memory.

Pipelining reduces the instruction cycle time by overlapping the operations of the major logic blocks. For example, the instruction cache, register file and ALU can be in separate pipeline stages. During operation, the stages concurrently process distinct instructions. On every advancement of a system dock each stage passes its result to the following stage.

Superpipelined designs increase data throughput by increasing the number of pipeline stages, thereby enabling the CPU to work on portions of several instructions simultaneously. Generally, a superpipeline is an extended pipeline (longer than the four traditional fetch, decode, execute and write stages) that is typically docked at some higher multiple of either the CPU, instruction cache or external memory dock.

Superscalar microprocessors contain two or more parallel execution units and therefore can simultaneously process more than one instruction per cycle. An example "two-scalar" processor would fetch two instructions from the instruction cache, have two sets of register addresses and read and write ports, and two functional units such as ALUs. Where a "one-scalar" processor can inject at most one instruction per cycle into its pipeline, the example two-scalar superscalar processor has enough resources to handle up to two instructions per cycle (one instruction per pipeline). Typically, a superscalar processor will also be pipelined.

Not all successive dusters of instructions in a program are suitable for concurrent execution. Therefore, superscalar processors usually have extra logic that examines the instruction stream and decides how many instructions to issue for execution in each cycle. The complexity of this logic depends on the instruction set architecture and the particular set of execution resources the designers chose to include. Often superscalar processors will put the extra instruction examination logic in an extra pipeline stage between the fetch and register read stages.

A "younger" instruction, for example, can require a result calculated by a preceding "older" instruction as the base upon which the younger instruction will build its result. In such a case, the instruction examination logic, typically, will delay dispatching the younger instruction (i.e. entering the younger instruction into an execution pipeline for execution) until the older instruction has calculated the data upon which the younger instruction depends. In a second example, it may be that only one pipeline within the superscalar processor is able to execute a particular type of instruction. If two instructions in an instruction stream are of this particular type, the instruction examination logic will typically dispatch the older instruction into the selected pipeline and delay dispatching the younger instruction until the selected pipeline is available.

When a group of instructions execute in parallel in a superscalar processor, it may be that one of the instructions will cause an exception to occur. When the exception occurs, each instruction in the group of instructions that is after the instruction that caused the exception (i.e. that is younger than the excepting instruction) will typically be canceled. Once the exception has been handled, the instructions that are younger than the excepting instruction are then re-fetched, dispatched and executed.

If a superscalar processor is superpipelined, it is typical that a pipeline that handles a simple instruction will require fewer execution stages than a pipeline that handles a relatively more complex instruction. Consider, for example, a two-scalar superpipelined processor. In this example processor, one execution pipeline is divided into five stages to handle a relatively more complex instruction and the other execution pipeline is divided into two stages to handle a relatively more simple instruction. Thus, the simple pipeline will have a final result at the end of the second stage, but the complex pipeline will not have a final result for three more stages. To handle exceptions, and to balance the pipelines, additional stages are typically added to the simple pipeline. In this example, three additional stages would be added to the simple pipeline so that both the simple and complex pipelines would have five stages. Each of these additional stages is a dummy stage that holds the result of the final simple instruction until its corresponding complex pipeline stage completes. Adding these additional stages to the simple instruction pipeline permits the final result from both pipelines to be written to the register file at the same time (i.e. at the end of the fifth stage).

The addition of dummy stages simplifies exception handling in the case where an instruction pair is being executed that is made up of a complex instruction followed by a simple instruction and an exception occurs for the (older) complex instruction after the (younger) simple instruction has arrived at its final result. In such a case, executing the simple instruction produces a final result that is not valid because of the exception produced by the older instruction and the permanent state change of the simple instruction should be deferred. If the additional stages were not added to the simple instruction pipeline, the simple instruction result could possibly have been written back to the register file before the exception occurs for the complex instruction. With the additional stages added to the simple instruction pipeline, the final result of the simple instruction is not written to the register file until the complex instruction has successfully completed. Therefore, if an exception occurs on an older complex instruction, it is a simple matter to invalidate the final result of the younger simple instruction in the additional stages before the simple instruction final result has been written back to the register file. Thus, an instruction can be dispatched and executed speculatively. The speculative instruction will not update the state of the computer until each instruction older than the speculative instruction has completed successfully.

Note that in the above example, the simple instruction final result is known three stages before it is written to the register file. A typical superscalar superpipeline design will capitalize upon this fact by providing a selector circuit at the beginning of each execution pipeline. The data generated by some (or all) stages of some (or all) execution pipelines are latched in temporary result registers and fed into the selection logic. The selection logic is then used to select between the output ports of the register file and the generated data of some (or all) execution stages of some (or all) pipelines. This permits an instruction that depends upon the data generated by an execution stage of an older instruction to be dispatched into an execution pipeline as soon as the required execution stage data for the older instruction has been generated. Therefore, dispatching of the younger instruction does not need to be delayed until the generated data of the older instruction has been written to the register file. Instead, the selection logic is used to provide the instruction being dispatched with the most recently generated data with respect to the instruction being dispatched.

Each stage of a pipeline typically generates a temporary result that is input into the next stage of the pipeline. Just as a pipeline may require the final result of a pipeline to be provided as an input, it is also the case that an intermediate result can be used as an input for a pipeline. Thus, for example, a two stage pipeline could perform the step of adding the contents of two registers in a first stage and then, in a second stage, shift the sum obtained in the first stage. If the temporary result of the first stage is used by a subsequent instruction that requires as input the sum derived in the first stage of the two stage pipeline, the throughput of the processor can be increased by providing the sum for use by the subsequent instruction.

There are several problems associated with the introduction of temporary result registers into the pipelines of a superscalar processor. As the number of pipelines and the number of stages per pipeline is increased, so too must the number of inputs to the selector circuits at the beginning of each execution pipeline. This problem is exacerbated when the width (i.e. number of bits) of the data path is also increased. To provide several wide inputs into a selection circuit uses a large amount of area in an integrated circuit chip and it is a difficult task to route the temporary results from multiple stages of multiple pipelines into multiple selector circuits.

Pitch, for the purposes of this discussion, can be thought of as the physical width of the temporary registers, of the selection logic or of the functional units. The pitch of the functional units of each pipeline is typically greater than the minimum pitch required for the temporary registers and selection logic placed between the stages. Typically, the size of the temporary registers and selection logic of a pipeline is artificially increased above the minimum required size so that the temporary registers and selection logic have a pitch that matches the pitch of the functional units of the pipeline. Thus, area on the chip is wasted in order to match the pitch of the temporary registers and selection logic placed between the stages of the functional units to the pitch of the functional units of a pipeline.

Additionally, because the temporary registers and selection logic are typically placed on the critical data path of the pipeline, they increase the length of each pipeline stage. This slows down the pipeline and, if extra stages are added to the pipelines, makes balancing the longer pipelines more complex. Moreover, because the selection logic is dispersed throughout the pipelines, if the selection logic must be modified, several logic blocks within the processor must be changed.

The trend in designing superscalar, superpipelined processors is towards increasing the number of pipelines, increasing the number of execution stages within each pipeline and increasing the width of the data path of each pipeline. The approach of adding a selector circuit at the beginning of each execution pipeline is not feasible when a large number of pipeline stages from a large number of pipelines each provide a wide data path input into the selector logic of each pipeline.

SUMMARY OF THE INVENTION

A processor method and apparatus is disclosed. The processor has an execution pipeline, a register file and a controller. The execution pipeline is for executing an instruction and has a first stage for generating a first result and a last stage for generating a final result. The register file is for storing the first result and the final result. The controller makes the first result stored in the register file available in the event that the first result is needed for the execution of a subsequent instruction. By storing the result of the first stage in the register file, the length of the execution pipeline is reduced from that of the prior art. Furthermore, logic required for providing inputs to the execution pipeline is greatly simplified over that required by the prior art.

BRIEF DESCRIPTION OF THE DRAWINGS

The objects, features, and advantages of the method and apparatus of the present invention will be apparent from the following detailed description of the invention in which.

DETAILED DESCRIPTION OF THE INVENTION

A method and apparatus for implementation of a temporary pipeline register file mechanism for computer processor architectures is disclosed. The method and apparatus disclosed has particular application to superpipelined and superscalar microprocessor based computer systems.

In the following description, for purposes of explanation, specific numbers, materials and configurations are set forth in order to provide a thorough understanding of the present invention. It will be apparent to one skilled in the art, however, that the present invention may be practiced without these specific details. In other instances, well known systems are shown in diagrammatic or block diagram form in order not to obscure the present invention unnecessarily.

Figure 1:
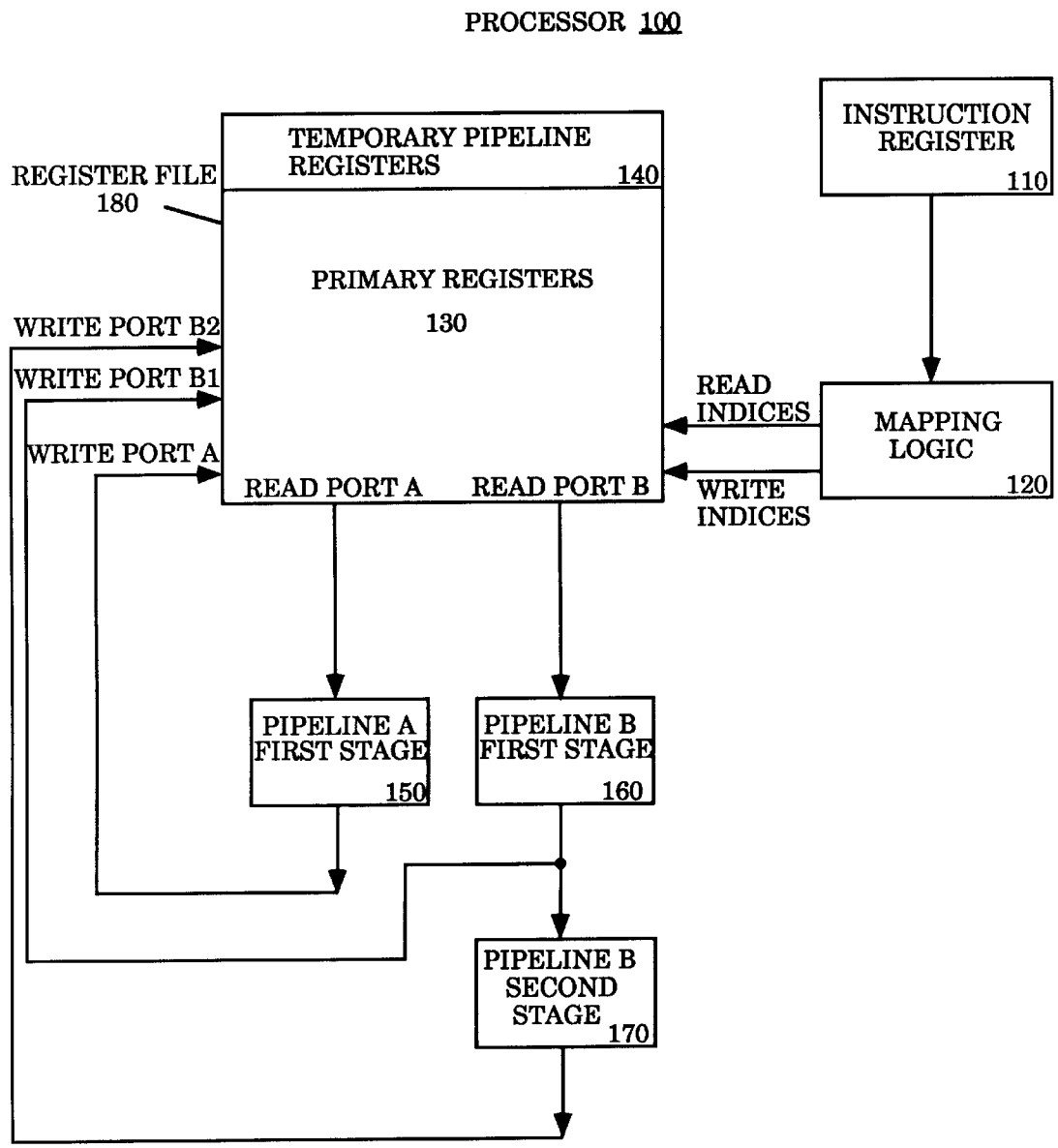
FIG. 1 illustrates a processor that receives pipeline inputs from a register file that has been augmented with temporary pipeline registers that store temporary data generated by stages of the pipelines.

Referring now to FIG. 1, a processor 100 is illustrated that receives pipeline inputs from a register file that has been augmented with temporary pipeline registers that store temporary data generated by stages of the pipelines.

The processor 100 is a superscalar processor because it has more than one pipeline, i.e. pipeline A and pipeline B. Furthermore, processor 100 is superpipelined because pipeline B is divided into more than one execution stage, i.e. pipeline B first stage 160 and pipeline B second stage 170. Pipeline A, on the other hand, only has one execution stage, pipeline A first stage 150. To avoid unnecessarily obscuring the concepts to be discussed, FIG. 1 has been highly simplified by reducing it to the minimum number of pipelines and stages that can still present the concepts to be discussed. It is anticipated that in actual embodiments the number of pipelines can be increased to a number greater than two and the number of execution stages within a given pipeline can also be greater than two.

In FIG. 1 it can be seen that register file 180 provides input to pipeline A first stage 150 through read port A and provides input to pipeline B first stage 160 through read port B. Typically, read ports A and B of register file 180 will be multiple ports providing multiple inputs into their respective pipelines. The final result of pipeline A is written back to register file 180 through write port A from pipeline A first stage 150. Similarly, the final result of pipeline B is written back to register file 180 through write port B2 from pipeline B second stage 170. The temporary result of pipeline B first stage 160 is also written to register file 180 through write port B1 from pipeline B first stage 160.

A typical instruction being executed by a pipeline stage will provide two inputs to the pipeline and result in one final result output from the pipeline being written back to the register file. Therefore, for example, an add instruction could specify that the contents stored in a first register file 180 register be added to the contents stored in a second register file 180 register and the sum be written back to a third register file 180 register. If this example instruction were being executed by pipeline A, then the contents of the first and second register file 180 registers would be provided to pipeline A first stage 150 from the first and second register file 180 registers through read port A. Pipeline A first stage 150 would then calculate the sum and provide the sum to write port A of register file 180 where it would ultimately be stored in the third register of register file 180.

It is possible however that an instruction could have more than two operands which need to be provided to the execution pipeline that is to execute the instruction. Thus, a store instruction, for example, can have three inputs provided to the pipeline to execute the store instruction from register file 180 through the read port for the pipeline. In the example store instruction, two of the inputs could be used to calculate a register to which data provided from the third input was to be stored.

In processor 100, register file 180 has been divided into temporary pipeline registers 140 and primary registers 130. A typical register file such as register file 180 can have hundreds of primary registers. Therefore, in an example embodiment where there are 512 primary registers in the register file, a particular primary register of register file 180 could be specified by a 9-bit binary number ($2^9=512$).

As discussed above, a typical approach in prior art processors would be to balance pipeline A and pipeline B by adding an additional stage to the end of pipeline A so that pipeline A would then have the same number of stages as pipeline B. A temporary result register would then be inserted after pipeline A first stage 150 to store the result of pipeline A first stage 150 so that it could be provided to either pipeline before the result had been written to a register file 180. A temporary result register would also be inserted in pipeline B between pipeline B first stage 160 and pipeline B second stage 170 to temporarily store the result of pipeline B first stage 160 so that the temporary result could be provided as input to either pipeline.

In the embodiment presented in FIG. 1, register file 180 has been augmented by the addition of temporary pipeline registers 140. This permits the final result of pipeline A first stage 150 and the temporary result of pipeline B first stage 160 to be written to register file 180 immediately after they have been calculated. The result from pipeline A first stage 150 is written to a register of temporary pipeline registers 140 where it is held speculatively until all older instructions successfully complete execution. At that time, the result of pipeline A is transferred from the temporary pipeline register of temporary pipeline registers 140 to its actual destination primary register of primary registers 130. If a result from pipeline B first stage 160 is a final result, it will be transferred to the register file 130 when all older instruction successfully completes execution.

Mapping logic 120 keeps track of the ultimate destination registers for contents stored in temporary pipeline registers 140 and the relative age (i.e. position in program order) of the instruction that produced the contents stored in them. When an instruction enters mapping logic 120 from instruction register 110, the instruction uses programmer addressable register indexes to specify primary registers to provide inputs to the pipeline that will dispatch the instruction. These programmer addressable register indexes are the register addresses or register numbers for primary registers 130 and will hereinafter be referred to as virtual indexes. Thus, for example, in the case where register file 180 has up to 512 primary registers 130, the primary registers would be addressed by the programmer as a 9-bit binary number that had the decimal range of zero through 511. If the actual index provided by mapping logic 120 to register file 180 is increased by 1-bit, the number of registers that can be addressed in register file 180 is doubled. Therefore, in the case where register file 180 has 512 programmer addressable primary registers, increasing the index for register file 180 from 9-bits to 10-bits will permit register file 180 to have 1,024 registers ($2^{10}=1024$) that can be addressed. Therefore, by increasing the index of register file 180 from 9-bits to 10-bits, up to 512 temporary pipeline registers 140 in register file 180 can be addressed and made available for holding temporary result data from stages of the pipelines. In the unlikely event that an even greater number of temporary pipeline registers 140 are required, the index to register file 180 can be increased by adding additional bits.

Thus, when an instruction from instruction register 110 specifies an input to a pipeline, mapping logic 120 will determine whether one or more registers of temporary pipeline registers 140 contains more recently generated result that could be used by the pipeline. A more recently generated result is a temporary result of a youngest, older instruction, or a final result of a youngest, older instruction that has yet to be stored in its destination primary register, that can be used as an input for the instruction. If no register of temporary pipeline registers 140 contains data matching this criterion, then mapping logic 120 will provide, as a read index, a real (physical) index into register file 180 that corresponds to the virtual index specified by the instruction. This will cause the contents stored in the specified primary register of register file 180 to be retrieved through a register file 180 read port for the pipeline where the instruction will be dispatched. Thus, the contents stored in the primary register specified by the instruction will be provided as an input into the pipeline where the instruction will be dispatched.

If, on the other hand, mapping logic 120 determines that a register of temporary pipeline registers 140 contains recently generated data that can be provided as the input to the pipeline, then mapping logic 120 will find the register file 180 index (real index) of the temporary pipeline registers 140 that contains the most recently generated result. This real index, in turn, is specified by mapping logic 120 thereby causing the temporary result to be produced at the proper read port of register file 180 as input to the execution pipeline into which the instruction will be dispatched.

It may also be the case that the data required as input to a pipeline is not currently available in either the primary registers 130 or the temporary pipeline registers 140. In the former case, this could occur for example because a load operation that is to fill the primary register with the required data has not completed. In the latter case, for example, this could happen because the required data is to be calculated by an instruction that has not yet advanced through the pipeline to the point where the required data has been generated. In either case, the mapping logic 120 will wait until the required data has been provided to the respective primary of temporary pipeline register before reading the data from the register file 180.

Mapping logic 120 also specifies write indices to register file 180 when temporary and final results are provided by the pipelines to write ports of register file 180. Each write index of the write indices specified by mapping logic 120 indicates the primary register of the primary registers 130 or the temporary pipeline register of the temporary pipeline registers 140 to which a final or temporary result is to be written. Write indices are determined at the same time when read indices are generated by mapping logic 120. These write indices may be maintained in mapping logic 120 or sent along with the instruction to the execution pipeline for the instruction.

The addition of temporary pipeline registers 140 to register file 180 provides several advantages over the prior art. In the first place, the selector circuitry between the read ports of register file 180 and the execution stages of the pipelines are eliminated. Thus, no matter how many pipelines there are in the processor, or how many stages there are within a given pipeline, temporary data will always be provided through the read ports of register 180 as though they were provided by primary registers 130. This technique, in effect, converts register file 180 into a selector circuit This is a more efficient approach than found in the prior art because the random access memory (RAM) of register file 130 can be accessed efficiently using techniques, such as Y decoding, that are more efficient than providing ad hoc multiplexer circuitry for each input to the pipeline of the processor.

Another advantage of the approach of FIG. 1 is that the temporary registers and mapping logic that would have been required by prior art approaches have been incorporated into temporary pipeline registers 140 and mapping logic 120, respectively. This provides several benefits. One benefit is that the mapping logic circuitry and temporary registers have been removed from the data path of each pipeline. This permits the data path of each pipeline to be smaller thereby reducing the cycle time of the processor by reducing the amount of time necessary for data to pass through each pipeline.

Additionally, the area of the processor circuitry is decreased because components are grouped with other components that have approximately the same pitch. Thus, there is no need to artificially increase the size of components to match pitches. Therefore all of the stages of the pipelines can be combined into a compact area on the processor chip. Furthermore, all of the temporary pipeline registers 140 are combined into a compact area within the register file 180 and all of the mapping logic circuitry is combined into a compact centralized area of mapping logic 120. Moreover, components are grouped by functionality, therefore it is easier to make changes because all components of a similar functionality are found in one place rather than being dispersed throughout the chip.

Figure 2:
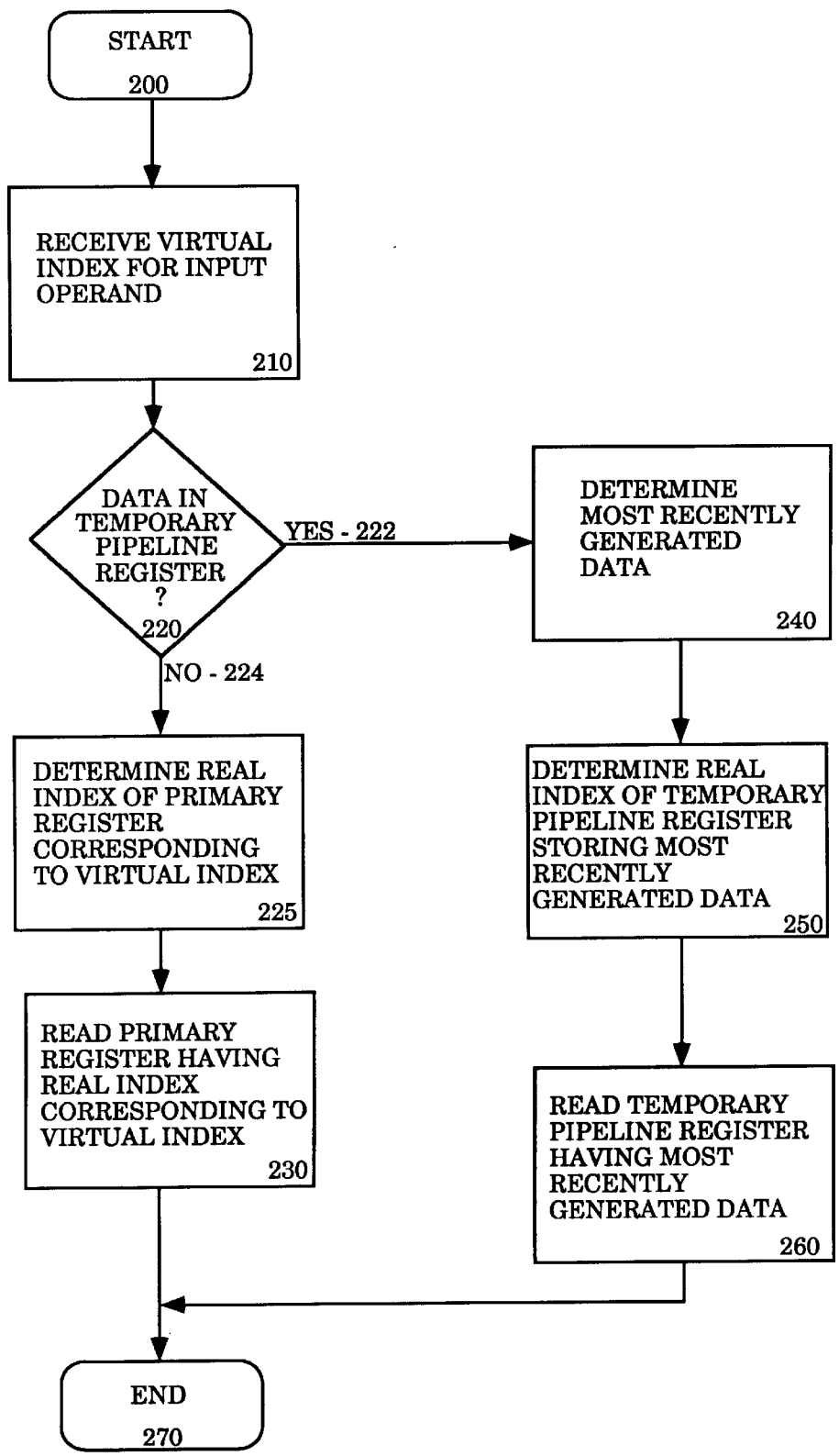
FIG. 2 illustrates a flow chart describing the process of selection of an input from the register file to a pipeline of the processor of FIG. 1.

Referring now to FIG. 2, a flow chart is illustrated that describes the process of selecting the contents of a register file to be input to a pipeline of the processor of FIG. 1. The process of FIG. 2 will be performed for each input operand of each instruction to be dispatched. Depending upon the manner of implementation chosen, the process of FIG. 2 can either be performed sequentially or in parallel.

The process of FIG. 2 begins in start bubble 200 and proceeds to process block 210. In process block 210, the mapping logic receives an input operand from an instruction to be executed. The input operand is a virtual register index of a primary register in the register file that is to provide an input into the execution pipeline into which the instruction will be dispatched.

In decision block 220, the mapping logic determines whether or not at least one of the temporary pipeline registers contains temporary or final result data that can provide as input more recently generated data than the primary register having the virtual register index specified by the instruction. If no temporary pipeline register has contents that meet this criteria, then decision path 224 is taken from decision block 220 to process block 225. In process block 225, the mapping logic will convert the virtual register index to a corresponding real register file index. The corresponding real register file index is then specified in process block 230 as a read index for a read port to the pipeline where the instruction will be dispatched. This causes the register file to provide the contents of the primary register having the specified real register file index as an input into the execution pipeline where the instruction is to be dispatched.

Referring again to decision block 220, decision path 222 is taken to process block 240 if recently generated data that could be provided as an input was found to be stored in the temporary pipeline registers. In process block 240, the mapping logic finds all of the instructions that are older than the instruction to be dispatched and that have stored data in a temporary pipeline register that could be provided as an input to the pipeline where the instruction is to be dispatched. If more than one older instruction meets this criteria, the most recently generated data is determined in process block 240.

Then, in process block 250, the mapping logic determines the real register file index of the most recently generated data found in process block 240. The real register file index found in process block 250 is then specified in process block 260 to be read from the register file as an input to the pipeline that is to execute the instruction to be dispatched. The process of FIG. 2 then terminates at terminal bubble 270.

Note that the mapping of registers in the register file can be accomplished in several different ways. In one embodiment, each register of the temporary pipeline registers corresponds to a temporary register that would have been employed using a prior art design. In this embodiment, the temporary pipeline register contents are transferred from one temporary pipeline register corresponding to a stage of a pipeline to the temporary pipeline register corresponding to the next stage of a pipeline with every cycle of the superpipeline.

In an alternate embodiment, the mapping function is made more sophisticated to exploit the fact that, once a pipeline has reached a final result, the result will not change. Thus, rather than shifting the contents of the register file temporary pipeline registers, the index mapping is changed by the mapping logic with each superpipelined cycle. In this way, once a final result is written into an temporary pipeline register, it will stay in that particular register until it is to be stored in the primary register for which it is destined.

In yet another embodiment, the division between the primary registers and the temporary pipeline registers within the register file is eliminated. Thus, the contents are written to a register of either the primary registers or the temporary pipeline registers and the mapping function adjusts the mapping between virtual indexes and real indexes as required. Therefore, once a final result is written to the register file, it will stay in the register of the register file to which it was written and the mapping logic will adjust the mapping so that the register will correspond to each successive dummy stage of the pipeline and finally will correspond to the destination primary register.

Figure 3:
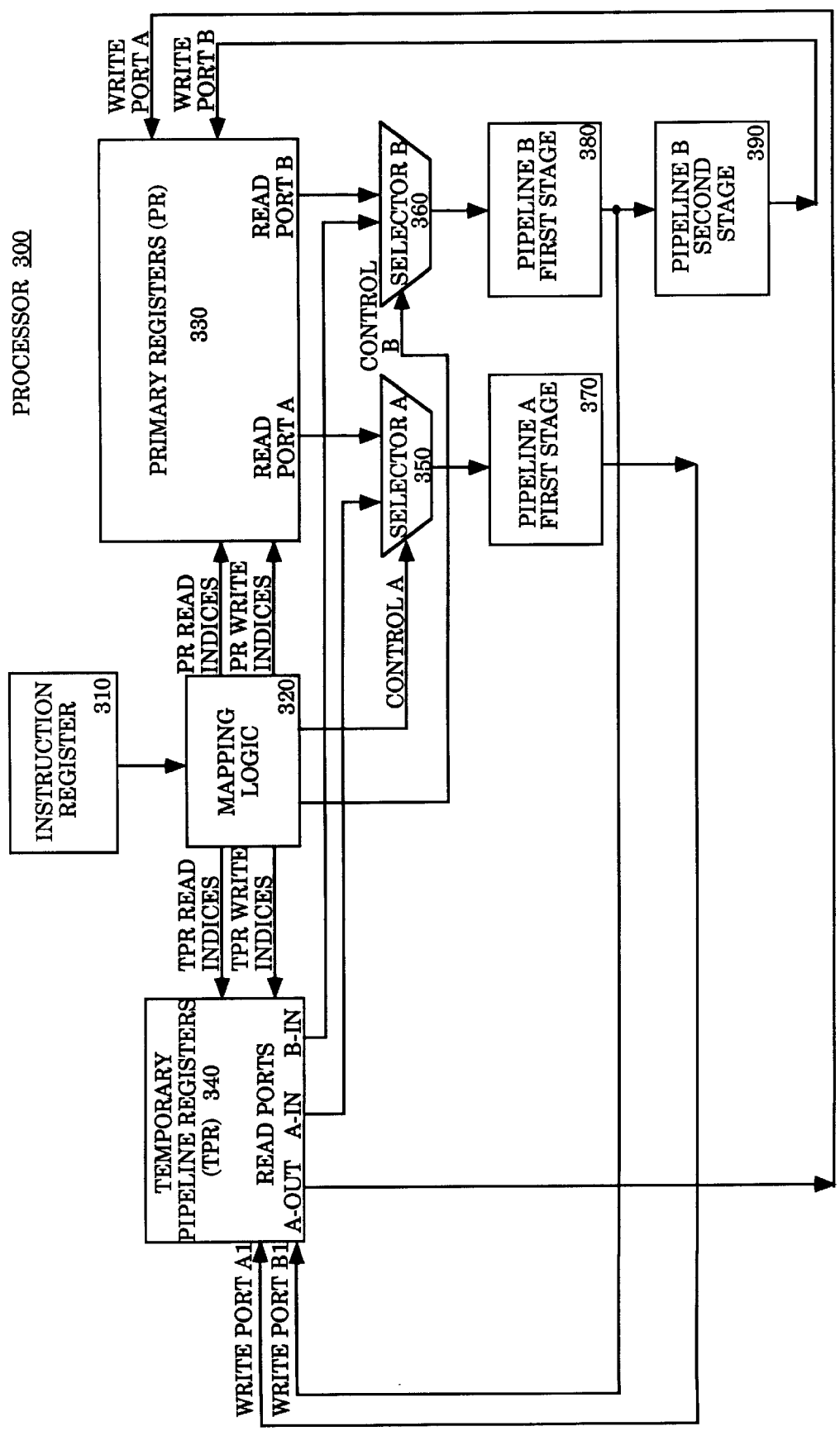
FIG. 3 illustrates a processor that selectively receives pipeline inputs from a primary register file or from a temporary pipeline register file that stores temporary data generated by stages of the pipelines; and, FIG. 4 illustrates a flow chart describing the process of selection of an input to a pipeline of the processor of FIG. 3 from the primary register file or from the temporary pipeline register file.

Referring now to FIG. 3, an alternate embodiment processor is illustrated. Processor 300 selectively receives pipeline inputs from primary registers 330 or from temporary pipeline registers 340. Thus, rather than increasing the depth of the register file as done in the embodiment depicted in FIG. 1, processor 300 of FIG. 3 has two separate register files, primary registers 330 are the programmer addressable primary registers and temporary pipeline registers 340 are the temporary registers.

As in processor 100 of FIG. 1, processor 300 of FIG. 3 is a superscalar processor because it has more than one pipeline, i.e. pipeline A and pipeline B. Furthermore, processor 300 is superpipelined because pipeline B is divided into more than one execution stage (identified in the figure as pipeline B first stage 380 and pipeline B second stage 390). Pipeline A, on the other hand, has only one execution stage, pipeline A first stage 370. Once again, to avoid unnecessarily obscuring the concepts to be discussed, FIG. 3 has been highly simplified by reducing it to the minimum number of pipelines and stages that can still present the concepts to be discussed. It is anticipated that in actual embodiments the number of pipelines can be increased to a number greater than two and the number of execution stages within a given pipeline can also be greater than two. Also, although processor 300 only shows one input from each selector of a pipeline to its pipeline, it is anticipated that, as in processor 100 of FIG. 1, in actual embodiments at least two inputs will be provided to each pipeline.

In processor 300 of FIG. 3, selector A 350 and selector B 360 provide the inputs to pipeline A and pipeline B, respectively. When an instruction from instruction register 310 is to be dispatched into a pipeline, mapping logic 320 issues parallel requests to the primary registers 330 and to the temporary pipeline registers 340 for the information to be input into the pipeline to which the instruction will be dispatched. If there is at least one temporary or final result stored in a register of temporary pipeline registers 340 that can provide an appropriate input to the pipeline (a "hit"), then mapping logic 320 requests the temporary or final result corresponding to the most recently generated data that can provide the appropriate input to be dispatched in the pipeline. Also, when a hit is found in temporary pipeline registers 340, mapping logic 320 issues a control signal to the selector for the pipeline that will dispatch the instruction to cause the information retrieved from the temporary pipeline registers 340 to be provided as an input to the pipeline in place of the input from the primary registers 330.

If, on the other hand, no hit is found in temporary pipeline registers 340, then the input retrieved from the primary registers 330 is selected to be input into the pipeline that will execute the instruction. This selection is made by the assertion of a control signal from mapping logic 320 to the selector for the pipeline. In the case where a pipeline has multiple input operands, multiple control signals (one per operand) will control the selector for the pipeline.

Thus, for example, selector A 350 provides the input to pipeline A first stage 370 when an instruction is dispatched in pipeline A. Mapping logic 320 places a request to primary registers 330 for the input into pipeline A through a primary register read indices signal line. Register file registers 330 will retrieve the information stored at the register having virtual index A and provide the requested information through read port A to selector A 350.

Concurrently, mapping logic 320 will determine whether there is at least one temporary or final result stored in temporary pipeline registers 340 that would provide a more recent, and hence more appropriate, input to pipeline A than the contents stored in primary registers 330. If more than one register of temporary pipeline registers 340 meets this criterion, then mapping logic 320 will pick the most recently generated data to be input to selector A 370. This temporary pipeline register will be addressed through a temporary pipeline registers read indices signal line and will be read into selector A 350 from temporary pipeline registers 340 through read port A-in.

If no data was found in temporary pipeline registers 340 that is a suitable input to pipeline A, then mapping logic 320 will set signal line control A, to cause selector A 350 to choose as input to pipeline A first stage 370 the output of read port A of primary registers 330. If, on the other hand, an appropriate input is found in temporary pipeline registers 340, then mapping logic 320 will set control A to cause selector A 350 to choose as input to pipeline A first stage 370 the output of temporary pipeline registers 340 that is provided to selector A 350 from read port A-in.

In the above description, signal line control A is always actively set to cause the selection of an input from the primary registers 330 or from the temporary pipeline registers 340. In an alternate embodiment, selector A 350 is set to select primary registers 330 by default as the source of an input into pipeline A. Then, if a hit occurs in temporary pipeline registers 340, signal line control A is activated to select the input from the temporary pipeline registers 340. In a different alternate embodiment, selector A 350 is set to select temporary pipeline registers 340 by default as the source of an input into pipeline A. Then, if no hit occurs in temporary pipeline registers 340, signal line control A is activated to select the input from the primary registers 330. In alternate embodiments where a default input source for selector A 350 is chosen, the default source would be selected to be the most likely input source.

Once pipeline A first stage 370 has executed the instruction dispatched in pipeline A, the result is written to a register of temporary pipeline registers 340 through write port A1. This final result is stored speculatively in temporary pipeline registers 340. Then, after all older instructions have successfully completed execution, the final result is retrieved through read port A-out from temporary pipeline registers 340 and written through write port A to the appropriate register of primary registers 330. The appropriate read and write indices to control this operation are specified by mapping logic 320.

In a similar manner, mapping logic 320 requests inputs for pipeline B from primary registers 330 using the primary registers read indices signal and from temporary pipeline registers 340 using the temporary pipeline registers read indices signal line. The inputs are then provided to selector B 360 from primary registers 330 by read port B and from temporary pipeline registers 340 by read port B-in. The appropriate input to pipeline B is then selected through selector B 360 by control line control B from mapping logic 320.

In the above description, signal line control B is always actively set to cause the selection of an input from the primary registers 330 or from the temporary pipeline registers 340. In an alternate embodiment, selector B 360 is set to select primary registers 330 by default as the source of an input into pipeline B. Then, if a hit occurs in temporary pipeline registers 340, signal line control B is activated to select the input from the temporary pipeline registers 340. In a different alternate embodiment, selector B 360 is set to select temporary pipeline registers 340 by default as the source of an input into pipeline B. Then, if no hit occurs in temporary pipeline registers 340, signal line control B is activated to select the input from the primary registers 330. In alternate embodiments where a default input source for selector B 360 is chosen, the default source would be selected to be the most likely input source.

The temporary result produced by pipeline B first stage 380 is written to temporary pipeline registers 340 through write port B1. The final result of pipeline B second stage 390 is written to the appropriate register of primary registers 330 through write port B.

Processor 300 provides many advantages over prior art processors. In processor 300 the mapping logic and temporary registers have been removed from the data path of each pipeline thereby reducing the critical path and cycle time of a pipeline. This also permits stages to be matched by pitch so that the total area used by the pipelines is reduced. Furthermore, temporary pipeline registers 340 can be implemented as random access memory rather than as individual ad hoc temporary registers that require more space. Also, logic is grouped by functionality. Grouping by functionality makes design revisions easier to perform because all similar functioned circuitry is located in one place. Grouping by functionality further permits circuit pitches to be matched efficiently. This leads to compact designs. In one embodiment of processor 300, mapping logic 320 is implemented using content addressable memory (CAM) thereby providing further advantages than could be provided by ad hoc mapping logic dispersed throughout the processor.

Moreover, although processor 300 has a selector placed at the beginning of each pipeline, each selector only has two inputs from which to select, one from primary registers 330 and the other from temporary pipeline registers 340. This design architecture scales well because, as additional pipelines or pipeline stages are added, there is no need to increase the number of inputs to a selector at the beginning of a pipeline.

Figure 4:
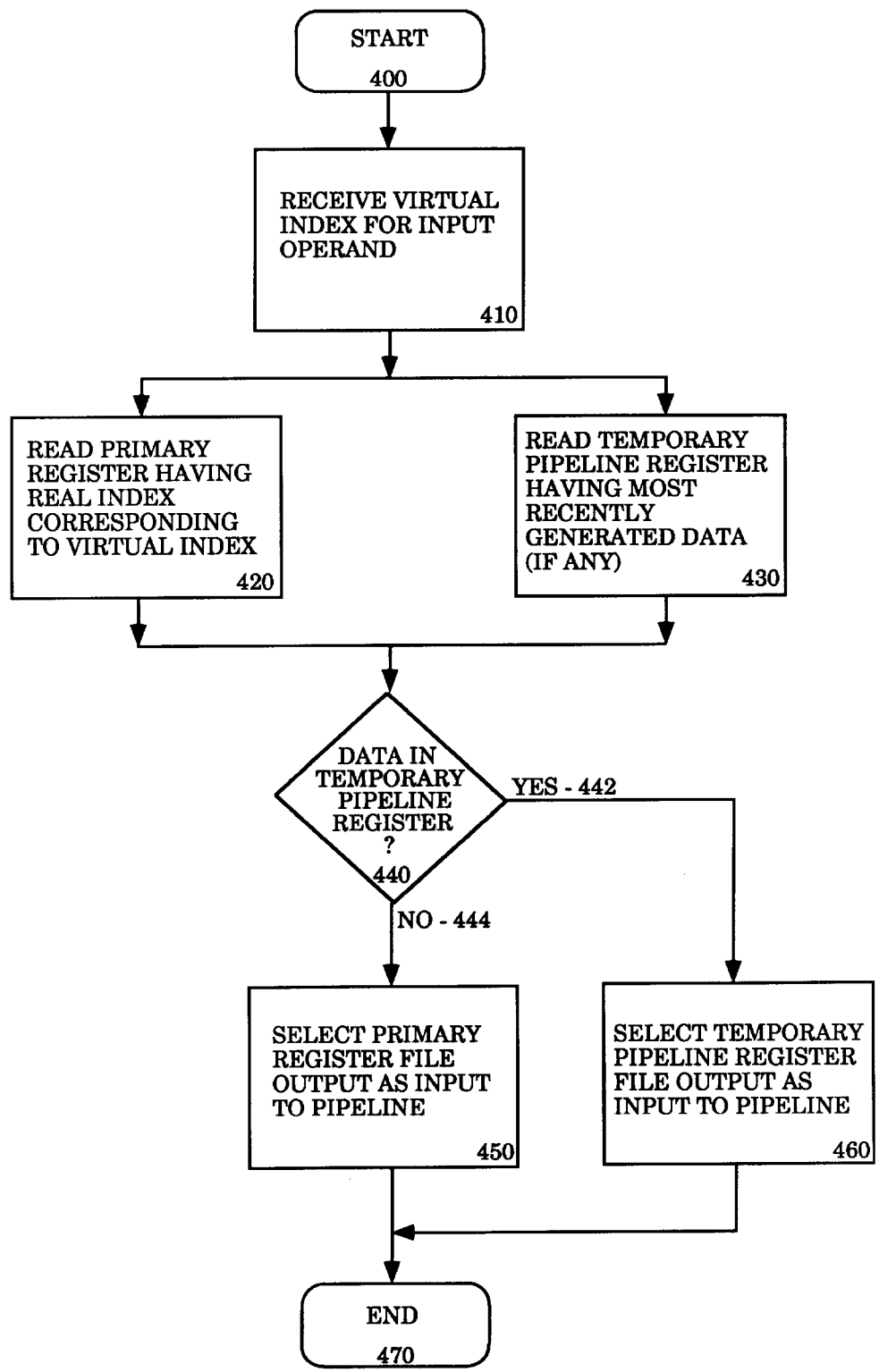

Referring now to FIG. 4, a flow chart describing the process of selection of an input to a pipeline of the processor of FIG. 3 is illustrated. As was the case with the process of FIG. 2, the process of FIG. 4 is performed either in series or in parallel for each instruction operand of each instruction to be dispatched.

The process of FIG. 4 starts at start bubble 400 and proceeds to process block 410 where the mapping logic receives an input operand that specifies a virtual register index of an input to a pipeline. Process blocks 420 and 430 are then executed in parallel. In process block 420, the primary register having the real index corresponding to the virtual index is read and the contents are provided to the selector at the beginning of the pipeline into which the instruction will be dispatched. At the same time, in process block 430, a test is made to determine whether at least one temporary or final result is stored in the temporary pipeline registers that corresponds to an older instruction that can provide a more recently generated data as input to the pipeline than the input provided from the register file. If only one such temporary pipeline register is found, then it is read and provided to the selector of the pipeline into which the instruction is to be dispatched. If more than one register of the temporary pipeline registers meets this criterion, then the temporary pipeline register containing the most recently generated data that meets this criterion is selected and read from the temporary registers to provide an input to the selector of the pipeline into which the instruction is to be dispatched.

After process blocks 420 and 430 have completed, a test is performed in decision block 440 to determine whether data was found in the temporary pipeline registers that can provide a more recently generated input to the pipeline than can be provided from the primary registers. If a more recently generated data was found stored in the temporary pipeline registers, then decision path 442 is taken to process block 460 where the output of the temporary pipeline registers is selected to be the input to the pipeline. The process then ends at terminal bubble 470.

If, on the other hand, in decision block 440, it is determined that there was no more recently generated data found in the temporary pipeline registers, then decision path 444 is taken to process block 450. In process block 450, the output from the primary registers is selected to provide the input to the pipeline. The process then ends at terminal bubble 470.

While the method and apparatus of the present invention has been described in terms of its presently preferred and alternate embodiments, those skilled in the art will recognize that the present invention may be practiced with modification and alternation within the spirit and scope of the appended claims. The specifications and drawings are, accordingly, to be regarded in an illustrative rather than a restrictive sense.

What is claimed is:

1. A processor, comprising:

a first execution pipeline to execute a first instruction and including a first stage to generate a first result and a last stage to generate a final result;

a register file to store the first result and the final result, the register file including a temporary register to store the first result of the first stage, a primary register to store the final result, and a multiplexer;

a controller to make available the first result stored in the register file in the event that the first result is needed for the execution of a subsequent instruction, the multiplexer being controlled by the controller to select between the temporary and primary registers; and at least one additional execution pipeline to execute at least one additional instruction, the first instruction preceding a second instruction in program order and if the first result generated from execution of the first instruction is needed for the execution of the second instruction, the controller directs the needed first result to the execution pipeline of the second instruction, wherein only a most recently stored needed first result is directed by the controller to the execution pipeline of the second instruction.

2. The processor of claim 1, wherein the first execution pipeline further comprises at least one intermediate stage between the first stage and the last stage.

3. The processor of claim 2, wherein at least one result of the at least one intermediate stage is stored in the register file.

4. A method for executing instructions by processor comprising the steps of:

- executing a first instruction in a first execution pipeline, and generating a first result in a first stage and a final result in a last stage of the first execution pipeline;
- storing the first result in a temporary register and the final result in a primary register of a register file;
- if needed for executing a subsequent instruction, selecting between the temporary and primary registers and thereby making available the first result or the final result for executing the subsequent instruction;
- executing at least one additional instruction in at least one additional execution pipeline, the first instruction preceding the additional instruction in program order, and, if needed for executing the additional instruction, directing the first result generated in the first execution pipeline to the execution pipeline of the additional instruction,
- executing the first instruction in the first pipeline;
- storing the first result in the register file;
- directing the needed first result to the execution pipeline of the second instruction; and
- executing the second instruction using the needed first result
- wherein only a most recently stored needed first result is directed by the controller to the execution pipeline of the second instruction.

5. The method of claim 4 further comprising the step of storing in the register file at least one result of an at least one intermediate stage positioned between the first stage and the last stage.

6. The method as set forth in claim 4 further comprising the steps of:

- executing the first instruction in the first execution pipeline;
- storing the first result in the register file;
- providing the first result from the register file to a subsequent instruction that needs the first result to execute; and
- executing the subsequent instruction that needs the first result.

7. A computer system, comprising:

main memory to store data and instructions;

a processor to execute the instructions using the data of the main memory, the processor including:

- a first execution pipeline to execute a first instruction and including a first stage to generate a first result and a last stage to generate a final result;
- a register file to store the first result and the final result, the register file including a temporary register to store the first result of the first stage, a primary register to store the final result, and a multiplexer;
- a controller to make available the first result stored in the register file in the event that the first result is needed for the execution of a subsequent instruction, the multiplexer being controlled by the controller to select between the temporary and primary registers; and
- at least one additional execution pipeline to execute at least one additional instruction, the first instruction preceding a second instruction in program order and if the first result generated from execution of the first instruction is needed for the execution of the second instruction, the controller directs the needed first result to the execution pipeline of the second instruction, wherein only a most recently stored needed first result is directed by the controller to the execution pipeline of the second instruction.

8. The computer system of claim 7, wherein the first execution pipeline further comprises at least one intermediate stage between the first stage and the last stage.

9. The computer system of claim 8, wherein at least one result of the at least one intermediate stage is stored in the register file.

* * * * *